(12) United States Patent
Jungnickel

(10) Patent No.: US 12,152,145 B2
(45) Date of Patent: Nov. 26, 2024

(54) POLYMERIC HANDLE MATERIAL AND USE THEREOF

(71) Applicant: The Gillette Company LLC, Boston, MA (US)

(72) Inventor: Uwe Jungnickel, Königstein (DE)

(73) Assignee: The Gillette Company LLC, Boston, MA (US)

( * ) Notice: Subject to any disclaimer, the term of this patent is extended or adjusted under 35 U.S.C. 154(b) by 170 days.

(21) Appl. No.: 17/517,990

(22) Filed: Nov. 3, 2021

(65) Prior Publication Data

US 2022/0145075 A1 May 12, 2022

(30) Foreign Application Priority Data

Nov. 6, 2020 (EP) .................................... 20206116

(51) Int. Cl.
- *A46B 5/02* (2006.01)
- *C08K 3/22* (2006.01)
- *C08L 77/00* (2006.01)

(52) U.S. Cl.
CPC ............... *C08L 77/00* (2013.01); *A46B 5/02* (2013.01); *C08K 3/22* (2013.01); *C08K 2003/2296* (2013.01)

(58) Field of Classification Search
None
See application file for complete search history.

(56) References Cited

U.S. PATENT DOCUMENTS

| | | |
|---|---|---|
| 3,103,680 A | 9/1963 | Abraham |
| 3,445,966 A | 5/1969 | Moore |
| 3,735,492 A | 5/1973 | Karter |
| 3,927,435 A | 12/1975 | Moret |
| 4,384,645 A | 5/1983 | Manfredi |
| 4,461,053 A | 7/1984 | Nitzsche et al. |
| 4,811,445 A | 3/1989 | Lagieski et al. |
| 5,109,563 A | 5/1992 | Lemon et al. |
| 5,137,039 A | 8/1992 | Klinkhammer |
| 5,233,891 A | 8/1993 | Arnold |
| 5,335,389 A | 8/1994 | Curtis et al. |

(Continued)

FOREIGN PATENT DOCUMENTS

| | | |
|---|---|---|
| CA | 2877731 A1 | 11/2009 |
| CN | 2131361 Y | 5/1993 |

(Continued)

OTHER PUBLICATIONS

Machine translation of WO 2005/002826 A1 (no date).*

(Continued)

*Primary Examiner* — Michael J Feely
(74) *Attorney, Agent, or Firm* — Gregory S. Darley-Emerson

(57) ABSTRACT

A polymeric handle material for a personal care implement comprises a polymer base material, and a filler material, preferably an inorganic filler material, wherein the polymer base material is selected from the group of polyamide, styrene acrylonitrile resin, polybutylene terephthalate, polyethylene terephthalate, recycled plastic materials, or mixtures thereof, and wherein the filler material constitutes from about 50 wt % to about 80 wt %, preferably from about 70 wt % to about 75 wt %, of the polymeric handle material.

20 Claims, 3 Drawing Sheets

(56) References Cited

U.S. PATENT DOCUMENTS

| | | |
|---|---|---|
| 5,361,446 A | 11/1994 | Rufo |
| 5,369,835 A | 12/1994 | Clarke |
| 5,515,754 A | 5/1996 | Elkins |
| 5,533,429 A | 7/1996 | Kozak |
| 5,575,443 A | 11/1996 | Honeycutt |
| 5,815,872 A | 10/1998 | Meginniss et al. |
| 5,875,510 A | 3/1999 | Lamond et al. |
| 5,956,796 A | 9/1999 | Lodato |
| 5,992,423 A | 11/1999 | Tevolini |
| 5,994,855 A | 11/1999 | Lundell |
| 6,015,328 A | 1/2000 | Glaser |
| 6,042,156 A | 3/2000 | Jackson |
| 6,086,373 A | 7/2000 | Schiff |
| 6,115,870 A | 9/2000 | Solanki et al. |
| 6,223,391 B1 | 5/2001 | Kuo |
| 6,230,716 B1 | 5/2001 | Minoletti |
| 6,276,019 B1 | 8/2001 | Leversby |
| 6,308,367 B1 | 10/2001 | Beals et al. |
| 6,345,406 B1 | 2/2002 | Dodd |
| 6,546,585 B1 | 4/2003 | Blaustein |
| 6,643,886 B2 | 11/2003 | Moskovich |
| 6,671,919 B2 | 1/2004 | Davis |
| 6,715,211 B1 | 4/2004 | Chi |
| 6,871,373 B2 | 3/2005 | Driesen |
| 6,872,325 B2 | 3/2005 | Bandyopadhyay et al. |
| 6,954,961 B2 | 10/2005 | Ferber et al. |
| 6,968,590 B2 | 11/2005 | Ponzini |
| 6,978,504 B1 | 12/2005 | Smith et al. |
| 7,055,205 B2 | 6/2006 | Aoyama |
| 7,137,166 B1 | 11/2006 | Kraemer |
| 7,240,390 B2 | 7/2007 | Pfenniger et al. |
| 7,458,125 B2 | 12/2008 | Hohlbein |
| 7,877,832 B2 | 2/2011 | Reinbold |
| 7,960,473 B2 | 6/2011 | Kobayashi |
| 8,210,580 B2 | 7/2012 | Engel et al. |
| 8,308,246 B2 | 11/2012 | Chung |
| 8,387,197 B2 | 3/2013 | Moskovich |
| 8,544,131 B2 | 10/2013 | Braun et al. |
| 8,549,691 B2 | 10/2013 | Moskovich et al. |
| 8,563,020 B2 | 10/2013 | Uhlmann |
| 8,701,235 B2 | 4/2014 | Kressner |
| 8,727,141 B2 | 5/2014 | Akalin |
| 8,763,189 B2 | 7/2014 | Jungnickel et al. |
| 8,763,196 B2 | 7/2014 | Kraemer |
| 8,769,758 B2 | 7/2014 | Jungnickel et al. |
| 8,800,093 B2 | 8/2014 | Moskovich et al. |
| 8,931,855 B1 | 1/2015 | Foley et al. |
| 8,955,185 B2 | 2/2015 | Huy |
| 8,966,697 B2 | 3/2015 | Kim et al. |
| 8,985,593 B1 | 3/2015 | Gao |
| 9,049,921 B1 | 6/2015 | Rackston |
| 9,066,579 B2 | 6/2015 | Hess |
| 9,126,346 B2 | 9/2015 | Meier et al. |
| 9,161,544 B2 | 10/2015 | Agrawal et al. |
| 9,168,117 B2 | 10/2015 | Yoshida et al. |
| 9,226,508 B2 | 1/2016 | Uhlmann et al. |
| 9,265,335 B2 | 2/2016 | Foley et al. |
| 9,402,461 B2 | 8/2016 | Brik et al. |
| 9,427,077 B1 | 8/2016 | Zhang |
| 9,486,066 B2 | 11/2016 | Bresselschmidt |
| D775,469 S | 1/2017 | Sikora et al. |
| 9,538,836 B2 | 1/2017 | Mintel et al. |
| 9,539,750 B2 | 1/2017 | Gross et al. |
| 9,572,553 B2 | 2/2017 | Post |
| 9,596,928 B2 | 3/2017 | Pardo et al. |
| 9,609,940 B2 | 4/2017 | Corbett |
| 9,635,928 B2 | 5/2017 | Morgott |
| 9,642,682 B2 | 5/2017 | Kato |
| 9,737,134 B2 | 8/2017 | Moskovich |
| 9,775,693 B2 | 10/2017 | Fattori |
| 9,848,968 B2 | 12/2017 | Jungnickel |
| 9,865,184 B2 | 1/2018 | Jungnickel et al. |
| D814,195 S | 4/2018 | Sikora et al. |
| 9,987,109 B2 | 6/2018 | Sokol et al. |
| 9,993,066 B2 | 6/2018 | Bresselschmidt et al. |
| 10,021,959 B2 | 7/2018 | Jimenez et al. |
| 10,021,962 B2 | 7/2018 | Tschol et al. |
| 10,058,089 B1 | 8/2018 | Stephens |
| 10,149,532 B2 | 12/2018 | Tschol et al. |
| 10,182,644 B2 | 1/2019 | Jimenez et al. |
| 10,189,972 B2 | 1/2019 | Stibor et al. |
| 10,195,005 B2 | 2/2019 | Wallström et al. |
| 10,244,855 B2 | 4/2019 | Wechsler |
| 10,244,857 B2 | 4/2019 | Nelson et al. |
| 10,314,387 B2 | 6/2019 | Jungnickel et al. |
| 10,413,390 B2 | 9/2019 | Yao |
| 10,548,393 B2 | 2/2020 | Xi et al. |
| 10,561,481 B2 | 2/2020 | Fugger |
| 10,639,133 B2 | 5/2020 | Bloch et al. |
| 10,642,228 B1 | 5/2020 | Cardinali et al. |
| 10,660,430 B2 | 5/2020 | Jimenez et al. |
| 10,660,733 B2 | 5/2020 | Schaefer et al. |
| 10,667,892 B2 | 6/2020 | Bärtschi et al. |
| 10,743,646 B2 | 8/2020 | Jimenez et al. |
| 10,758,327 B2 | 9/2020 | Katano et al. |
| 10,792,136 B2 | 10/2020 | May et al. |
| D901,183 S | 11/2020 | Jungnickel et al. |
| 10,842,255 B2 | 11/2020 | Görich et al. |
| 10,874,205 B2 | 12/2020 | Alinski et al. |
| D912,988 S | 3/2021 | Langhammer |
| D917,298 S | 4/2021 | Hallein et al. |
| D926,048 S | 7/2021 | Hallein et al. |
| D926,049 S | 7/2021 | Hallein et al. |
| 11,051,605 B2 | 7/2021 | Tschol |
| D927,972 S | 8/2021 | Hallein et al. |
| D930,990 S | 9/2021 | Hallein et al. |
| D931,617 S | 9/2021 | Hallein et al. |
| D931,619 S | 9/2021 | Hallein et al. |
| D933,368 S | 10/2021 | Albay et al. |
| D936,484 S | 11/2021 | Hallein et al. |
| 11,219,302 B2 | 1/2022 | Alinski et al. |
| 11,364,102 B2 | 6/2022 | Barnes et al. |
| 11,375,802 B2 | 7/2022 | Jungnickel |
| 11,382,409 B2 | 7/2022 | Jungnickel et al. |
| 11,388,984 B2 | 7/2022 | Jungnickel |
| 11,388,985 B2 | 7/2022 | Jungnickel et al. |
| 11,399,622 B2 | 8/2022 | Jungnickel |
| 11,400,627 B2 | 8/2022 | Jungnickel et al. |
| 11,425,991 B2 | 8/2022 | Stoerkel et al. |
| 11,547,116 B2 | 1/2023 | Wingfield et al. |
| 11,553,782 B2 | 1/2023 | Jungnickel et al. |
| 11,553,784 B2 | 1/2023 | Jungnickel |
| 11,553,999 B2 | 1/2023 | Scherrer et al. |
| 11,571,060 B2 | 2/2023 | Jungnickel |
| 11,653,752 B2 * | 5/2023 | Görich ............... A46B 5/0095 15/176.1 |
| 11,659,922 B2 | 5/2023 | Jungnickel |
| 11,672,633 B2 | 6/2023 | Jungnickel et al. |
| 11,684,148 B2 | 6/2023 | Farrell et al. |
| D998,974 S | 9/2023 | Albay |
| 11,865,748 B2 | 1/2024 | Jungnickel |
| D1,019,146 S | 3/2024 | Albay |
| 2001/0035079 A1 | 11/2001 | Kesinger et al. |
| 2003/0077107 A1 | 4/2003 | Kuo |
| 2003/0080474 A1 | 5/2003 | Boland |
| 2003/0115706 A1 | 6/2003 | Ponzini |
| 2003/0205492 A1 | 11/2003 | Ferber et al. |
| 2004/0016073 A1 | 1/2004 | Knutson |
| 2004/0060138 A1 | 4/2004 | Pfenniger et al. |
| 2004/0187889 A1 | 9/2004 | Kemp et al. |
| 2005/0022322 A1 | 2/2005 | Jimenez et al. |
| 2005/0268414 A1 | 12/2005 | Kim |
| 2005/0286967 A1 | 12/2005 | Blauzdys |
| 2006/0021173 A1 | 2/2006 | Huber |
| 2006/0086370 A1 | 4/2006 | Omeara |
| 2007/0071541 A1 | 3/2007 | Vila |
| 2007/0222109 A1 | 9/2007 | Pfenniger et al. |
| 2008/0022484 A1 | 1/2008 | Caruso |
| 2008/0120795 A1 | 5/2008 | Reinbold |
| 2008/0183249 A1 | 7/2008 | Kitagawa et al. |
| 2008/0220235 A1 | 9/2008 | Izumi |
| 2009/0089950 A1 | 4/2009 | Moskovich et al. |
| 2009/0144920 A1 | 6/2009 | Nanda |
| 2010/0115724 A1 | 5/2010 | Huang |

(56) References Cited

U.S. PATENT DOCUMENTS

| | | |
|---|---|---|
| 2010/0263148 A1 | 10/2010 | Jimenez |
| 2010/0282274 A1 | 11/2010 | Huy |
| 2010/0325828 A1 | 12/2010 | Braun et al. |
| 2011/0016651 A1 | 1/2011 | Piserchio |
| 2011/0047729 A1 | 3/2011 | Iwahori et al. |
| 2011/0146015 A1 | 6/2011 | Moskovich |
| 2011/0225758 A1 | 9/2011 | Chung |
| 2011/0265818 A1 | 11/2011 | Jungnickel et al. |
| 2011/0314677 A1 | 12/2011 | Meier et al. |
| 2012/0036663 A1 | 2/2012 | Chen |
| 2012/0073072 A1 | 3/2012 | Moskovich et al. |
| 2012/0090117 A1 | 4/2012 | Akalin |
| 2012/0096665 A1 | 4/2012 | Ponzini |
| 2012/0112566 A1 | 5/2012 | Doll |
| 2012/0192366 A1 | 8/2012 | Cobabe et al. |
| 2012/0198640 A1 | 8/2012 | Jungnickel et al. |
| 2012/0227200 A1 | 9/2012 | Kraemer |
| 2012/0272923 A1 | 11/2012 | Stephens |
| 2012/0301528 A1 | 11/2012 | Uhlmann |
| 2012/0301530 A1 | 11/2012 | Uhlmann et al. |
| 2012/0301531 A1 | 11/2012 | Uhlmann et al. |
| 2012/0301533 A1 | 11/2012 | Uhlmann et al. |
| 2013/0000059 A1 | 1/2013 | Jungnickel et al. |
| 2013/0000061 A1 | 1/2013 | Park |
| 2013/0171225 A1 | 7/2013 | Uhlmann et al. |
| 2013/0291326 A1 | 11/2013 | Mintel |
| 2013/0308994 A1 | 11/2013 | Wu et al. |
| 2013/0315972 A1 | 11/2013 | Krasnow et al. |
| 2014/0012165 A1 | 1/2014 | Cockley |
| 2014/0137349 A1 | 5/2014 | Newman |
| 2014/0151931 A1 | 6/2014 | Altonen et al. |
| 2014/0259474 A1 | 9/2014 | Sokol et al. |
| 2014/0359957 A1 | 12/2014 | Jungnickel |
| 2014/0359958 A1 | 12/2014 | Jungnickel |
| 2014/0359959 A1 | 12/2014 | Jungnickel et al. |
| 2014/0371729 A1 | 12/2014 | Post |
| 2015/0010765 A1 | 1/2015 | Munro |
| 2015/0034858 A1 | 2/2015 | Raman |
| 2015/0107423 A1 | 4/2015 | Martn |
| 2015/0128367 A1 | 5/2015 | Jungnickel et al. |
| 2015/0143651 A1 | 5/2015 | Foley et al. |
| 2015/0147372 A1 | 5/2015 | Agrawal et al. |
| 2015/0170811 A1 | 6/2015 | Tanigawa et al. |
| 2015/0173502 A1 | 6/2015 | Sedic |
| 2015/0245618 A9 | 9/2015 | Agrawal et al. |
| 2015/0289635 A1 | 10/2015 | Erskine-Smith et al. |
| 2015/0305487 A1 | 10/2015 | Pardo et al. |
| 2015/0351406 A1 | 12/2015 | Wingfield et al. |
| 2016/0081465 A1 | 3/2016 | Metter |
| 2016/0135579 A1 | 5/2016 | Tschol et al. |
| 2016/0135580 A1 | 5/2016 | Tschol et al. |
| 2016/0220012 A1 | 8/2016 | Sprosta et al. |
| 2016/0220014 A1 | 8/2016 | Sprosta |
| 2016/0338807 A1 | 11/2016 | Bloch |
| 2017/0020277 A1 | 1/2017 | Barnes et al. |
| 2017/0079418 A1 | 3/2017 | Mintel |
| 2017/0333172 A1 | 11/2017 | Zheng |
| 2017/0347782 A1 | 12/2017 | Jimenez et al. |
| 2017/0347786 A1 | 12/2017 | Jimenez et al. |
| 2017/0367469 A1 | 12/2017 | Jimenez et al. |
| 2018/0016408 A1 | 1/2018 | Stibor et al. |
| 2018/0035797 A1 | 2/2018 | Mahawar |
| 2018/0055206 A1 | 3/2018 | Nelson et al. |
| 2018/0064516 A1 | 3/2018 | Wu |
| 2018/0092449 A1 | 4/2018 | Straka et al. |
| 2018/0110601 A1 | 4/2018 | Mighall et al. |
| 2018/0140404 A1 | 5/2018 | Schaefer et al. |
| 2018/0168326 A1 | 6/2018 | Davies-smith et al. |
| 2018/0235355 A1 | 8/2018 | Jungnickel et al. |
| 2018/0311023 A1 | 11/2018 | Yao |
| 2019/0000223 A1 | 1/2019 | Alinski |
| 2019/0029787 A1 | 1/2019 | Zhou |
| 2019/0069978 A1 | 3/2019 | Katano et al. |
| 2019/0104835 A1 | 4/2019 | Alinski |
| 2019/0117356 A1 | 4/2019 | Bärtschi et al. |
| 2019/0174906 A1 | 6/2019 | Bloch |
| 2019/0175320 A1 | 6/2019 | Bloch et al. |
| 2019/0200740 A1 | 7/2019 | Jungnickel |
| 2019/0200742 A1 | 7/2019 | Jungnickel |
| 2019/0200743 A1 | 7/2019 | Jungnickel |
| 2019/0200748 A1 | 7/2019 | Görich |
| 2019/0201745 A1 | 7/2019 | Mccarthy |
| 2019/0246779 A1 | 8/2019 | Jungnickel et al. |
| 2019/0246780 A1 | 8/2019 | Jungnickel et al. |
| 2019/0246781 A1 | 8/2019 | Jungnickel et al. |
| 2019/0248049 A1 | 8/2019 | Jungnickel et al. |
| 2019/0351463 A1 | 11/2019 | Wupendram |
| 2020/0022793 A1 | 1/2020 | Scherrer et al. |
| 2020/0031038 A1 | 1/2020 | Rodriguez Outon |
| 2020/0077778 A1 | 3/2020 | Jungnickel |
| 2020/0121069 A1 | 4/2020 | Jungnickel |
| 2020/0305588 A1 | 10/2020 | Jungnickel |
| 2020/0390228 A1 | 12/2020 | Farrell |
| 2020/0391371 A1 | 12/2020 | Nelson |
| 2021/0120948 A1 | 4/2021 | Görich et al. |
| 2021/0128286 A1 | 5/2021 | Jungnickel et al. |
| 2021/0145162 A1 | 5/2021 | Baertschi |
| 2021/0212446 A1 | 7/2021 | Jungnickel |
| 2021/0212447 A1 | 7/2021 | Jungnickel et al. |
| 2021/0212448 A1 | 7/2021 | Jungnickel |
| 2021/0220101 A1 | 7/2021 | Jungnickel et al. |
| 2021/0259818 A1 | 8/2021 | Jungnickel et al. |
| 2021/0307496 A1 | 10/2021 | Jungnickel et al. |
| 2021/0315368 A1 | 10/2021 | Jungnickel |
| 2021/0315369 A1 | 10/2021 | Jungnickel |
| 2021/0315370 A1 | 10/2021 | Jungnickel |
| 2021/0315675 A1 | 10/2021 | Jungnickel |
| 2022/0142344 A1 | 5/2022 | Jungnickel |
| 2022/0142345 A1 | 5/2022 | Jungnickel |
| 2022/0142346 A1 | 5/2022 | Jungnickel |
| 2022/0142347 A1 | 5/2022 | Jungnickel |
| 2022/0143854 A1 | 5/2022 | Jungnickel |
| 2022/0143884 A1 | 5/2022 | Jungnickel |
| 2022/0146024 A1 | 5/2022 | Lin |
| 2022/0152891 A1 | 5/2022 | Jungnickel et al. |
| 2022/0408907 A1 | 12/2022 | Zwimpfer |
| 2023/0157442 A1* | 5/2023 | Görich ................ A46B 5/0095 15/176.1 |

FOREIGN PATENT DOCUMENTS

| | | |
|---|---|---|
| CN | 2320102 | 5/1999 |
| CN | 1223834 | 7/1999 |
| CN | 1229341 A | 9/1999 |
| CN | 1229622 | 9/1999 |
| CN | 2346277 | 11/1999 |
| CN | 1241123 A | 1/2000 |
| CN | 201036392 | 3/2008 |
| CN | 201185740 | 1/2009 |
| CN | 201563874 U | 9/2010 |
| CN | 201630520 | 11/2010 |
| CN | 201675294 | 12/2010 |
| CN | 201861064 | 6/2011 |
| CN | 201861068 | 6/2011 |
| CN | 201949160 U | 8/2011 |
| CN | 202035662 | 11/2011 |
| CN | 202269590 U | 6/2012 |
| CN | 202286879 | 7/2012 |
| CN | 202476817 | 10/2012 |
| CN | 202566900 U | 12/2012 |
| CN | 102907880 | 2/2013 |
| CN | 102948997 | 3/2013 |
| CN | 202820100 | 3/2013 |
| CN | 202843252 U | 4/2013 |
| CN | 202941615 | 5/2013 |
| CN | 202959287 U | 6/2013 |
| CN | 202980745 | 6/2013 |
| CN | 103829559 | 6/2014 |
| CN | 103844575 | 6/2014 |
| CN | 104768420 A | 7/2015 |
| CN | 105054571 | 11/2015 |
| CN | 105411165 A | 3/2016 |
| CN | 205082879 | 3/2016 |
| CN | 105534002 | 5/2016 |

(56) References Cited

FOREIGN PATENT DOCUMENTS

| | | |
|---|---|---|
| CN | 205198181 U | 5/2016 |
| CN | 105750734 | 7/2016 |
| CN | 105818322 | 8/2016 |
| CN | 205568222 | 9/2016 |
| CN | 106132244 A | 11/2016 |
| CN | 106793866 A | 5/2017 |
| CN | 206714397 | 12/2017 |
| CN | 207055161 | 3/2018 |
| CN | 109259882 A | 1/2019 |
| CN | 111713845 A | 9/2020 |
| DE | 3241118 A1 | 8/1984 |
| DE | 4412301 A1 | 10/1995 |
| DE | 202005002964 | 7/2005 |
| DE | 202006019788 | 8/2007 |
| DE | 102006051649 | 5/2008 |
| DE | 202013001159 U1 | 3/2013 |
| DE | 202015002964 U1 | 8/2015 |
| EP | 0100975 A2 | 2/1984 |
| EP | 423510 A * | 4/1991 ............... C08K 3/22 |
| EP | 0481553 A1 | 4/1992 |
| EP | 2117395 A2 | 11/2009 |
| EP | 2218559 A1 | 8/2010 |
| EP | 2229917 A1 | 9/2010 |
| EP | 3090646 | 11/2016 |
| EP | 3381404 A1 | 10/2018 |
| EP | 3501333 A1 | 6/2019 |
| EP | 3892236 A1 | 10/2021 |
| EP | 3892234 B1 | 11/2023 |
| FR | 2835176 | 8/2003 |
| GB | 766486 | 1/1957 |
| GB | 2278537 A | 12/1994 |
| GB | 2493409 | 2/2013 |
| GB | 2556019 A | 5/2018 |
| IN | 201817043186 A | 11/2018 |
| JP | 61020509 | 1/1986 |
| JP | S63284262 | 11/1988 |
| JP | H05305010 A | 11/1993 |
| JP | H0669408 | 3/1994 |
| JP | 2561978 | 12/1996 |
| JP | 2619825 | 6/1997 |
| JP | H1199016 A | 4/1999 |
| JP | 2003009951 | 1/2003 |
| JP | 2003245132 | 9/2003 |
| JP | 2004089471 | 3/2004 |
| JP | 2005053973 | 3/2005 |
| JP | 4076405 | 2/2008 |
| JP | 2009011621 | 1/2009 |
| JP | 2011045621 | 3/2011 |
| JP | 2011087747 | 5/2011 |
| JP | 2015231500 A | 12/2015 |
| JP | 3206625 B2 | 9/2016 |
| JP | 6160619 B2 | 6/2017 |
| JP | 3213325 | 11/2017 |
| KR | 20060042059 A | 5/2006 |
| KR | 20070013844 | 1/2007 |
| KR | 20090030829 | 3/2009 |
| KR | 20100043124 A | 4/2010 |
| KR | 101142611 | 5/2012 |
| KR | 20130006243 U | 10/2013 |
| KR | 101339558 | 12/2013 |
| KR | 200473116 | 6/2014 |
| KR | 20150057308 | 5/2015 |
| KR | 20150105813 | 9/2015 |
| KR | 20160000035 A | 1/2016 |
| KR | 101591299 | 2/2016 |
| KR | 20160121554 A | 10/2016 |
| KR | 20160125725 | 11/2016 |
| KR | 20170062779 | 6/2017 |
| KR | 101847473 B1 | 4/2018 |
| KR | 200486759 Y1 | 6/2018 |
| KR | 101987341 B1 | 6/2019 |
| RU | 2141238 | 11/1999 |
| WO | 9510959 | 4/1995 |
| WO | 9838889 | 9/1998 |
| WO | 9844823 A2 | 10/1998 |
| WO | 2005002826 A1 | 1/2005 |
| WO | 2005030002 | 4/2005 |
| WO | 200641658 | 4/2006 |
| WO | 2008052210 A2 | 5/2008 |
| WO | 2008052250 A1 | 5/2008 |
| WO | 2008098107 A2 | 8/2008 |
| WO | 2009045982 A1 | 4/2009 |
| WO | 2011075133 A1 | 6/2011 |
| WO | 2012126126 | 9/2012 |
| WO | 2012144328 | 10/2012 |
| WO | 2013076904 | 5/2013 |
| WO | 2013101300 A1 | 7/2013 |
| WO | 2013158741 | 10/2013 |
| WO | 2013172834 A1 | 11/2013 |
| WO | 2014193621 | 12/2014 |
| WO | 2014197293 A1 | 12/2014 |
| WO | 2015061651 A1 | 4/2015 |
| WO | 2016189407 A1 | 12/2016 |
| WO | 2017139256 A1 | 8/2017 |
| WO | 2017155033 A1 | 9/2017 |
| WO | 2017173768 A1 | 10/2017 |
| WO | 2018025751 | 2/2018 |
| WO | 2019072925 A1 | 4/2019 |
| WO | 2019157787 A1 | 8/2019 |
| WO | 2021207751 A1 | 10/2021 |

OTHER PUBLICATIONS

Product Brochure for Grivory GV, provided by EMS-Grivory. (Year: 2014).*
PCT Search Report and Written Opinion for PCT/US2021/072225 dated Feb. 22, 2022, 10 pages.
All Office Actions; U.S. Appl. No. 18/100,730, filed Jan. 24, 2023.
U.S. Appl. No. 18/100,730, filed Jan. 24, 2023 to Gerald Görich et al.
U.S. Appl. No. 29/746,709, filed Aug. 17, 2020, Christine Hallein et al.
U.S. Appl. No. 29/659,068, filed Aug. 6, 2020, Christine Hallein et al.
U.S. Appl. No. 29/787,707, filed Jun. 8, 2021, Uwe Jungnickel et al.
U.S. Appl. No. 29/746,718, filed Aug. 17, 2020, Dominik Langhammer.
U.S. Appl. No. 29/757,499, filed Nov. 6, 2020, Christine Hallein et al.
U.S. Appl. No. 29/752,903, filed Sep. 29, 2020, Uwe Jungnickel et al.
U.S. Appl. No. 29/752,912, filed Sep. 29, 2020, Uwe Jungnickel et al.
U.S. Appl. No. 29/762,793, filed Dec. 18, 2020, Uwe Jungnickel et al.
U.S. Appl. No. 29/787,712, filed Jun. 8, 2021, Uwe Jungnickel et al.
U.S. Appl. No. 29/699,695, filed Jul. 29, 2019, Niclas Altmann et al.
U.S. Appl. No. 29/743,560, filed Jul. 22, 2020, Devran Albay et al.
U.S. Appl. No. 29/758,268, filed Nov. 13, 2020, Devran Albay et al.
U.S. Appl. No. 29/758,249, filed Nov. 13, 2020, Devran Albay et al.
U.S. Appl. No. 29/758,251, filed Nov. 13, 2020, Devran Albay et al.
U.S. Appl. No. 29/758,276, filed Nov. 13, 2020, Devran Albay et al.
U.S. Appl. No. 29/758,274, filed Nov. 13, 2020, Devran Albay et al.
U.S. Appl. No. 29/786,732, filed Jun. 2, 2021, Devran Albay et al.
U.S. Appl. No. 29/786,746, filed Jun. 2, 2021, Devran Albay et al.
U.S. Appl. No. 29/782,323, filed May 6, 2021, Christine Hallein et al.
U.S. Appl. No. 29/819,318, filed Dec. 14, 2021, Devran Albay et al.
U.S. Appl. No. 29/814,060, filed Nov. 3, 2021, Christine Hallein et al.
U.S. Appl. No. 29/814,616, filed Nov. 8, 2021, Christine Hallein et al.
All Office Actions; U.S. Appl. No. 18/524,201, filed Nov. 30, 2023.
Erik Gregersen, "Compounds", Britannica, Iron—Compounds, Allotropes, Reactions, Retrieved from Internet: https://www.britannica.com/science/iron-chemicalelement/Compounds#ref93312, Year 2007, 3 pages.
Jaime Aparecido Cury et al., "The Importance of Fluoride Dentifrices to the Current Dental Caries Prevalence in Brazil", Faculty of Dentistry of Piracicaba, Nov. 24, 2004, pp. 167-174.

(56) References Cited

OTHER PUBLICATIONS

U.S. Appl. No. 18/524,201, filed Nov. 30, 2023 to Uwe Jungnickel et al.
"Spring Plungers push fit stainless steel", KIPP, Aug. 9, 2015, 1 page.
"Steel and Stainless Steel Press Fit Ball Plunger with Stainless Ball", Northwestern Tools, Mar. 12, 2016, 1 page.
All Office Actions; U.S. Appl. No. 18/361,100, filed Jul. 28, 2023.
U.S. Appl. No. 18/361,100, filed Jul. 28, 2023 to Uwe Jungnickel et al.
CAEtool, Density of Materials, Retrieved from Internet: https://caetool.com/2017/10/12/p0016/, Dec. 12, 2022, 3 pages.
All Office Actions; U.S. Appl. No. 16/225,509, filed Dec. 19, 2018.
All Office Actions; U.S. Appl. No. 16/225,592, filed Dec. 19, 2018.
All Office Actions; U.S. Appl. No. 16/225,688, filed Dec. 19, 2018.
All Office Actions; U.S. Appl. No. 16/225,809, filed Dec. 19, 2018.
All Office Actions; U.S. Appl. No. 16/272,392, filed Feb. 11, 2019.
All Office Actions; U.S. Appl. No. 16/272,422, filed Feb. 11, 2019.
All Office Actions; U.S. Appl. No. 16/272,872, filed Feb. 11, 2019.
All Office Actions; U.S. Appl. No. 16/272,943, filed Feb. 11, 2019.
All Office Actions; U.S. Appl. No. 16/551,307, filed Aug. 26, 2019.
All Office Actions; U.S. Appl. No. 16/551,399, filed Aug. 26, 2019.
All Office Actions; U.S. Appl. No. 17/077,639, filed Oct. 22, 2020.
All Office Actions; U.S. Appl. No. 17/090,980, filed Jun. 11, 2020.
All Office Actions; U.S. Appl. No. 17/155,167, filed Jan. 22, 2021.
All Office Actions; U.S. Appl. No. 17/155,208, filed Jan. 22, 2021.
All Office Actions; U.S. Appl. No. 17/218,573, filed Mar. 31, 2021.
All Office Actions; U.S. Appl. No. 17/218,742, filed Mar. 31, 2021.
All Office Actions; U.S. Appl. No. 17/219,989, filed Apr. 1, 2021.
All Office Actions; U.S. Appl. No. 17/225,259, filed Apr. 8, 2021.
All Office Actions; U.S. Appl. No. 17/225,283, filed Apr. 8, 2021.
All Office Actions; U.S. Appl. No. 17/225,296, filed Apr. 8, 2021.
All Office Actions; U.S. Appl. No. 17/225,411, filed Apr. 8, 2021.
All Office Actions; U.S. Appl. No. 17/354,027, filed Jun. 22, 2021.
All Office Actions; U.S. Appl. No. 17/462,089, filed Aug. 31, 2021.
All Office Actions; U.S. Appl. No. 17/511,103, filed Oct. 26, 2021.
All Office Actions; U.S. Appl. No. 17/517,928, filed Nov. 3, 2021.
All Office Actions; U.S. Appl. No. 17/517,937, filed Nov. 3, 2021.
All Office Actions; U.S. Appl. No. 17/517,957, filed Nov. 3, 2021.
All Office Actions; U.S. Appl. No. 17/517,975, filed Nov. 3, 2021.
All Office Actions; U.S. Appl. No. 17/517,999, filed Nov. 3, 2021.
All Office Actions; U.S. Appl. No. 17/518,009, filed Nov. 3, 2021.
All Office Actions; U.S. Appl. No. 16/829,585, filed Mar. 25, 2020.
Extended European Search Report and Search Opinion; Application No 20206116.4; dated Mar. 16, 2021; 7 pages.
U.S. Appl. No. 17/462,089, filed Oct. 31, 2021, to first inventor et. al.
U.S. Appl. No. 17/511,103, filed Oct. 26, 2021, to first inventor et. al.
U.S. Appl. No. 17/517,928, filed Nov. 3, 2021 to first inventor et. al.
U.S. Appl. No. 17/517,937, filed Nov. 3, 2021, to first inventor et. al.
U.S. Appl. No. 17/517,957, filed Nov. 3, 2021, to first inventor et. al.
U.S. Appl. No. 17/517,975, filed Nov. 3, 2021, to first inventor et. al.
U.S. Appl. No. 17/517,999, filed Nov. 3, 2021, to first inventor et. al.
U.S. Appl. No. 17/518,009, filed Nov. 3, 2021, to first inventor et. al.
Density of Plastic Materials, Online retrieved from "https://omnexus.specialchem.com/polymer-property/density", 2024, 12 Pages.

\* cited by examiner

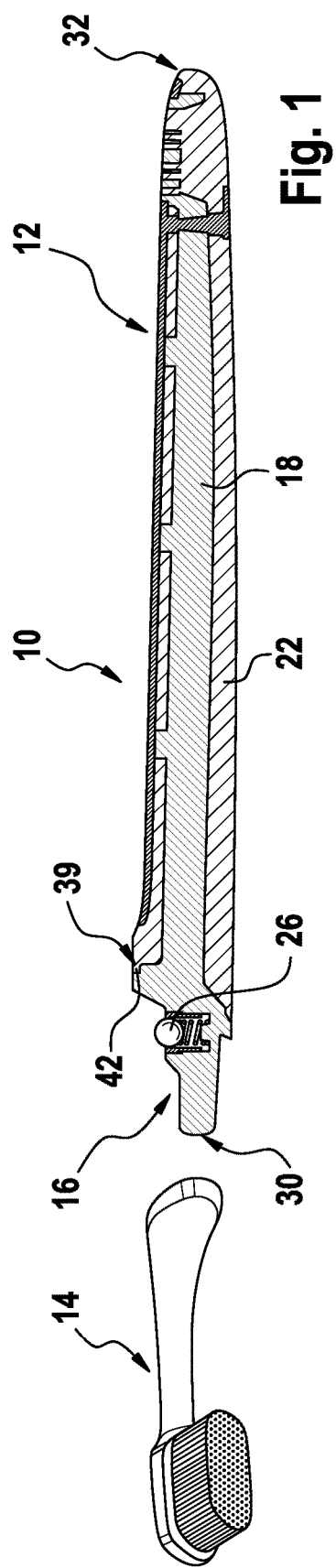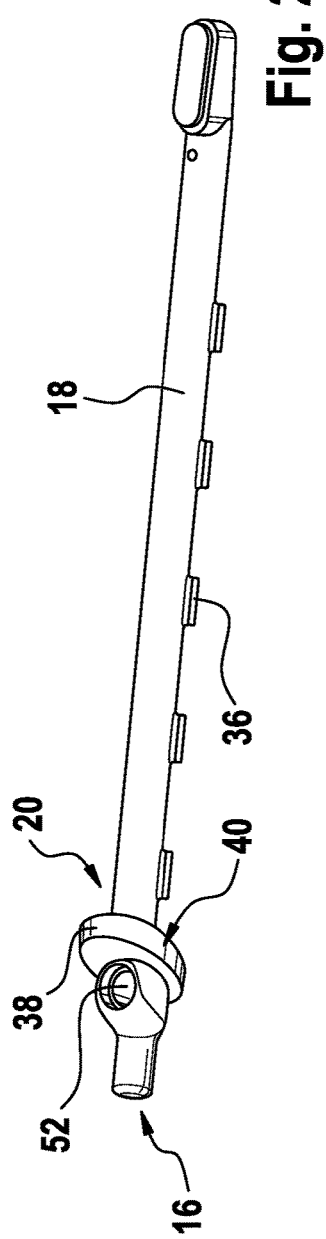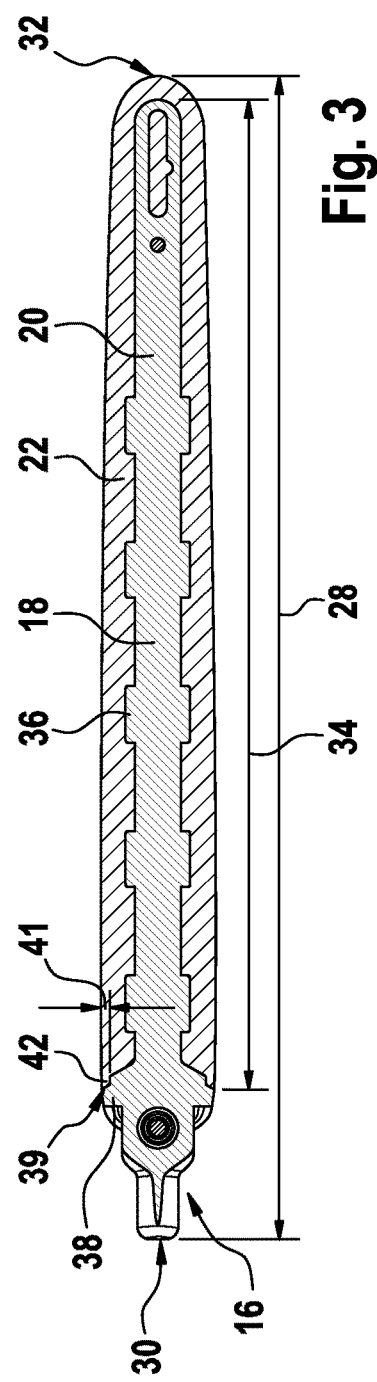

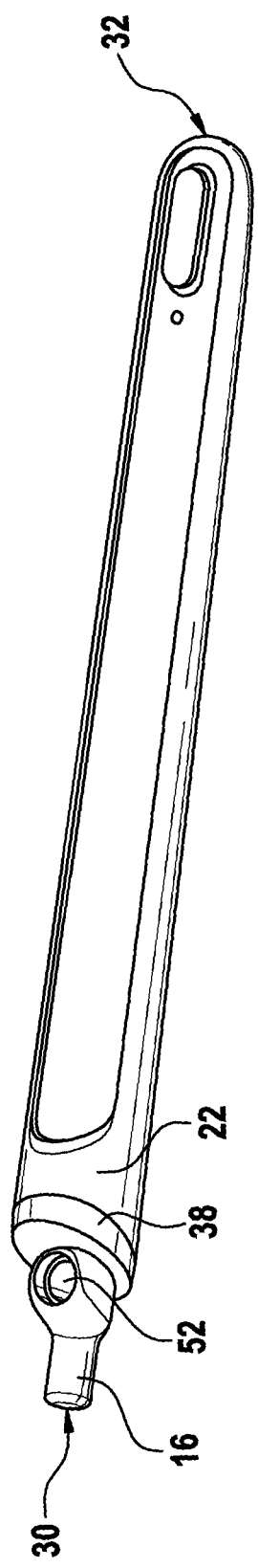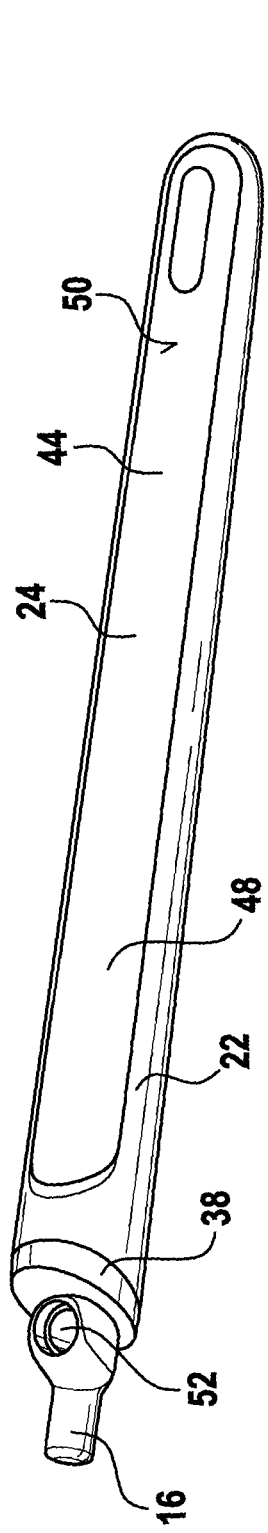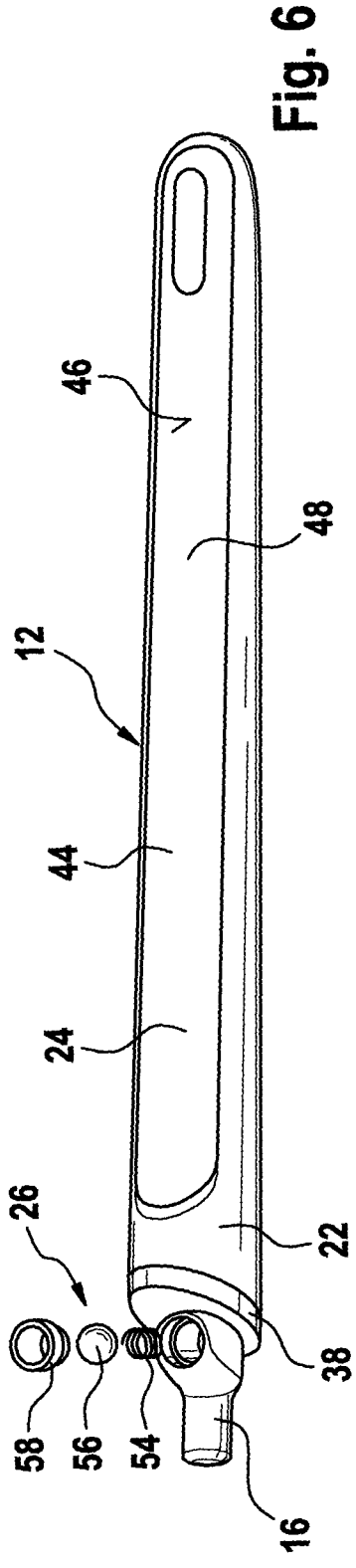

POLYMERIC HANDLE MATERIAL AND USE THEREOF

FIELD OF THE INVENTION

The present disclosure is concerned with a polymeric handle material, and its use as a handle material for a handle of a personal care implement, in particular for a handle of an oral care implement, the polymeric handle material comprising a polymer base material, and a filler material. The present disclosure is further concerned with a handle comprising the polymeric handle material, and a personal care implement comprising such handle and a head.

BACKGROUND OF THE INVENTION

Heads and handles for personal/oral care implements, like manual toothbrushes, are well known in the art. Generally, tufts of bristles for cleaning teeth are attached to a bristle carrier or mounting surface of a brush head intended for insertion into a user's oral cavity. A handle is usually attached to the head, which handle is held by the user during brushing. Usually, heads of manual toothbrushes are permanently connected to the handle, e.g. by injection molding the bristle carrier, the handle, and a neck connecting the head and the handle, in one injection molding step. After the usual lifetime of a toothbrush, i.e. after about three months of usage, the toothbrush is discarded. In order to provide environmentally friendly/sustainable manual toothbrushes generating less waste when the brushes are worn out and discarded, manual toothbrushes are known comprising heads or head refills being exchangeable, i.e. repeatedly attachable to and detachable from the handle. Instead of buying a completely new toothbrush, consumers can re-use the handle and buy a new/fresh head refill only. Such refills are usually less expensive and generate less waste than a conventional manual toothbrush.

For example, manual toothbrushes are known comprising a handle to which a replaceable head is connected. The handle is provided with a cavity within which the head is insertable. To provide a sufficiently strong connection between the head and the handle, the brush head is formed with a neck having a coupling anchor for engaging in a complementary engaging mechanism within a cavity provided in the handle.

In order to clean teeth effectively, appropriate maneuverability and good handling properties of the overall toothbrush have to be provided, which properties, inter alia, depend on the center of gravity of the handle/toothbrush, bending stiffness and weight of the handle, as well as the brush head. Usually, handles of toothbrushes have the shape of a linear rod to be handled and manipulated by a user as needed. Since manual toothbrushes with replaceable brush heads comprise an inner cavity within the handle portion to receive the replaceable head, it has been seen that such handles are relatively light, and are, thus, neither comfortable to handle nor easy to maneuver in the oral care cavity. Further, brushes comprising relatively light handles, e.g. handles comprising less material, or handles being made of common plastic materials, e.g. polypropylene, lie less comfortably in the hand. In order to compensate said drawbacks, the size of the cross-sectional area of the handle could be increased. However, relatively thick handles may also reduce ease of rotating the brush in the hand, thus, impeding the user reaching all areas in the oral cavity. Further, it is known that users/consumers use different brushing techniques, and, therefore, it is critical to identify optimal ergonomics of a toothbrush in order to provide good sensory feeling during brushing when using all types of brushing techniques.

Further, personal care implements, in particular toothbrushes, comprising relatively light handles, e.g. handles being made of common plastic materials, e.g. polypropylene, provide low product quality perception during use of the implement.

It is an object of the present disclosure to provide a material for a handle of a personal care implement which overcomes at least one of the above-mentioned drawbacks, in particular which allows for more comfort and improved quality perception of the handle. It is also an object of the present disclosure to provide a handle comprising such material, and a personal care implement comprising such handle and a head.

SUMMARY OF THE INVENTION

In accordance with one aspect, a polymeric handle material for a personal care implement is provided, the polymeric handle material comprising a polymer base material, and a filler material, preferably an inorganic filler material, wherein
 the polymer base material is selected from the group of: polyamide, styrene acrylonitrile resin, polybutylene terephthalate, polyethylene terephthalate, recycled plastic materials, or mixtures thereof, and wherein
 the filler material constitutes from about 50 wt % to about 80 wt %, preferably from about 70 wt % to about 75 wt %, of the polymeric handle material.

In accordance with one aspect, the use of the polymeric handle material as a handle material of a personal care implement is provided.

In accordance with one aspect, a handle for a personal care implement is provided, the handle comprising such polymeric handle material.

In accordance with one aspect, a personal care implement is provided, the personal care implement comprising such handle and a head.

BRIEF DESCRIPTION OF THE DRAWINGS

The invention is described in more detail below with reference to various embodiments and figures, wherein:

FIG. 1 shows an example embodiment of personal care implement according to the present disclosure, the implement comprising a head and a handle, the handle (shown in cross-sectional view along A-A) comprising a core-connector unit, a second component, a third component and a spring-loaded snap element;

FIG. 2 shows a perspective view of the core-connector unit of the handle of FIG. 1;

FIG. 3 shows a cross-sectional view along B-B of the handle of FIG. 1;

FIG. 4 shows a perspective view of the handle of FIG. 1 without the third component, and the spring-loaded snap element;

FIG. 5 shows a perspective view of the handle of FIG. 1 without the spring-loaded snap element;

FIG. 6 shows a perspective view of the handle of FIG. 1, with the spring-loaded snap element in exploded view;

DETAILED DESCRIPTION OF THE INVENTION

Figure 7:
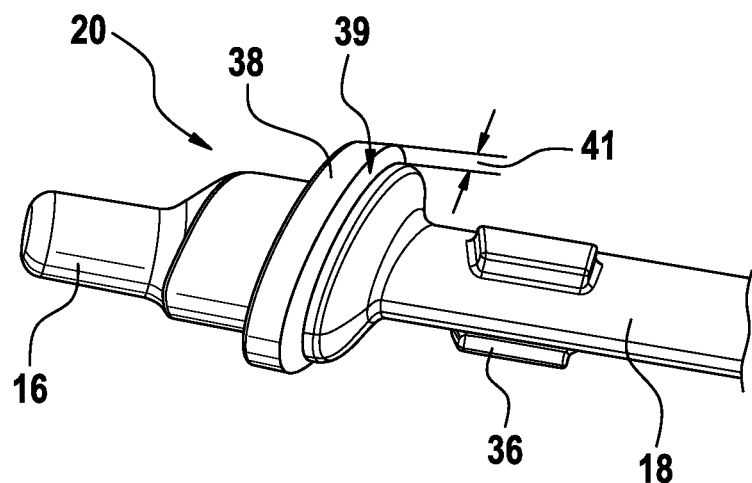
FIG. 7 shows the connector of the core-connector unit of FIG. 2.

A polymeric handle material according to the present disclosure can be used as a handle material for a handle of a personal care implement comprises a polymer base material, and a filler material, preferably an inorganic filler material.

The personal care implement according to the present disclosure may be any type of personal care implement, e.g. a wet shaving razor, or an oral care implement, preferably a toothbrush, e.g. a manual toothbrush. The head may be any type of replaceable refill, e.g. a razor cartridge or an oral-care refill, including but not limited to brush-head refills, interdental or toothpick refills, tongue/tissue-cleaner refills, and chemistry-applicator refills. A brush head may comprise at least one tooth cleaning element, e.g. a tuft of bristles and/or an elastomeric element, fixed to a mounting surface of the head.

The polymer base material according to the present disclosure may be used to form a second component which may at least partially cover a core structure of the handle.

The polymer base material of the polymeric handle material is selected from the following: polyamide, styrene acrylonitrile resin, polybutylene terephthalate, polyethylene terephthalate, recycled plastic materials, or mixtures thereof. The polymer base material may at least partially contain recycled plastic material.

Styrene acrylonitrile (SAN) as a polymer base material may provide high thermal resistance properties. The acrylonitrile units in the chain enable SAN to have a glass transition temperature greater than 100° C. The properties of SAN may allow for reduced cycle time during a molding step due to relatively earlier and quicker transition temperature. Amorphous polymers are suitable for heavy resin materials of the present disclosure due to the glass transition temperature Tg at which an amorphous polymer is transformed, in a reversible way, from a viscous or rubbery condition to a hard one. By injection molding of the fiber-reinforced material of the present disclosure, the temperature of the material melt is above the Tg region (viscous or rubbery condition). During cooling the compound attains the high Tg temperature early and reaches dimensional stability (glassy condition). Over-molding of the fiber-reinforced material is possible as the material stays dimensional stable due to the high Tg of the material.

Polybutylene terephthalate (PBT) and/or polyethylene terephthalate (PET) as a polymer base material may provide the handle with high quality surface properties, including improved optical characteristics, and high impact strength. Once heated, polybutylene terephthalate and polyethylene terephthalate represent a high temperature-resistant melt having low viscosity and a high Melt Flow Index (MFI). Therefore, processability of the fiber-reinforced material during molding may be improved.

Polyamide (PA) is defined as a polymer with repeating units linked by amide bonds. Polyamides exhibit high durability and strength. For example, polycaprolactam (PA6) and nylon6-6 (PA66) possess high tensile strength, rigidity, good stability under head as well as elasticity and lustre. PA6 and PA66 are highly resistant to abrasion and chemicals such as acids and alkalis. PA6 is generally white and can be dyed prior to production to various colors.

The polymeric handle further comprises a filler material, preferably an inorganic filler material. The filler material may be selected from the group of: zinc oxide, iron oxide, barium sulfate, titanium dioxide, aluminium oxide, or any combinations thereof. Zinc oxide, iron oxide, barium sulfate and titanium dioxide have a density of at least 4 $g/cm^3$, and may, thus, provide the polymeric material forming the second component with a relatively heavy weight. Further, a relatively high thermal conductivity of the second component can be provided if zinc oxide and/or aluminium oxide is used as a filler material.

In case zinc oxide is used as a filler material having a substantially white/light color, the polymer base material can be colored with any type of dye. Instead of applying an additional coating, e.g. by electroplating and/or lacquering the second component with a color coating (which would be required if a black/dark filler material was used, e.g. iron oxide), dye master batches can simply be added to the polymer base material.

The filler material constitutes from about 50 wt % to about 80 wt %, preferably form about 70 wt % to about 75 wt %, of the polymeric handle material providing the material with a relatively high density. The polymeric material of the second component may have a relatively high density from about 2 $g/cm^3$ to about 3.5 $g/cm^3$, preferably about 2.7 $g/cm^3$, which is significantly higher than the density of commonly used plastic handle materials. A density of about 2.7 $g/cm^3$ may be provided by a polymeric handle material comprising an inorganic filler material and a polymer base material, wherein the polymer base material may be polyamide, and wherein the inorganic filler material may be zinc oxide constituting from about 70 wt % to about 75 wt % of the polymeric material.

With a density from about 2 $g/cm^3$ to about 3.5 $g/cm^3$, preferably about 2.7 $g/cm^3$, the second component of the handle can be provided with a significantly higher weight and, thus, provides a different haptic impression to consumers during use of the handle as compared to commonly used handle materials, e.g. polypropylene having a density of about 0.9 $g/cm^3$ only. As the weight of the polymeric handle material may be relatively high, this may provide a user with high-quality perception and comfortable feeling during use of the personal care implement. Usually, users are accustomed that products, in particular in the personal care sector, have a specific weight that guarantees high product quality and provides comfortable feeling during use of the product. Consequently, the polymeric handle material used as a material for a handle of a personal care implement according to the present disclosure may provide such superior product quality perception.

The handle for a personal care implement according to the present disclosure may comprise a connector for repeatedly attaching and detaching a head to and from the handle. In a cavity provided in the connector, the connector may house a snap-fit locking mechanism, e.g. a spring-loaded ball element, for securely attaching the head to the handle, and for providing sufficiently strong connection and stability between the head and the handle to enable a user to perform, e.g. a brushing action.

The connector may be unitarily made with the core structure and may form with the core structure a core-connector unit, i.e. said unit may be formed as one piece which cannot be separated without destroying the unit. If the connector and the core structure are made as one unitary piece, e.g. in a single injection molding step, manufacturing could be simplified, and production costs reduced.

The core structure may be at least partially covered by the second component to form a handle body to be gripped by a user. In other words, the core structure is at least partially embedded in the polymeric handle material according to the present disclosure. While the core-connector unit may provide the handle with a skeleton, reinforcing brace or stiffening girder, the polymeric handle material according to the present disclosure can provide the handle/handle body with certain and superior haptics enabling easy and comfortable use of the handle.

According to the present disclosure, a circular collar/ring may be unitarily formed with the core-connector unit, e.g. in one injection molding step. The collar/ring may be provided at the intersection between the connector and the core structure. Such collar/ring may ensure a tight connection between the core-connector unit and the second component. When molding the second component material onto the core structure, the material of the second component shrinks to some extent, and consequently provides a press fit between the core-connector unit and the second component which ensures a secure and tight connection between the core-connector unit and the second component. Since the collar is provided at the intersection between the connector and the core structure, the collar can form a support/contact area for the second component.

The collar/ring may comprise a step or recess provided in the area being in direct contact with the second component. When the step provided in the outer geometry of the collar gets overmolded by the material forming the second component, a very tight fitting between the core-connector unit and the second component can be provided. Such tight fitting may eliminate any deep gaps between the core-connector unit and the second component, in which toothpaste slurry could accumulate otherwise, thereby rending the handle more hygienic. The step may have relatively small dimensions, e.g. a height from about 0.5 mm to about 1.5 mm, thereby still providing the benefits of a tight fit. If the height of the step is relatively small (e.g. from about 0.5 mm to about 1.5 mm) the layer of the second component material covering the step may be accordingly relatively thin, i.e. from about 0.5 mm to about 1.5 mm.

The press fit according to the present disclose may also be referred to as interference fit, or shrink fit, and is a form of fastening between two tight fitting mating parts that produces a joint which is held together also by friction after the parts are pushed together. A press fit or shrink fit allows the components to be joined without applying external force; the press fit/shrink fit is provided automatically by a relative size change after molding when the second component returns to normal room temperature. By heating the material of the second component to allow molding onto the core-connector unit, and by letting the material to return to ambient/room temperature a tight shrink fit between the core-connector unit and the second component can be provided. Such tight mechanical connection, i.e. a tight press fit/shrink fit according to the present disclosure may also enable the use of handle materials (for the core-connector unit and the second component, respectively) which do not form a chemical bond after molding.

The collar may abut and, thus, may be in direct contact with the second component which at least partially covers the core structure to provide an even tighter connection. Further, the collar may be substantially flush with the second component, and may provide an even outer lateral surface of the handle body without creating any gaps or edges in which paste and slurry could accumulate. Thus, such handle provides superior haptics, and renders the personal care implement more hygienic.

The handle may have a longitudinal extension extending between a proximal end closest to the head and a distal end, the distal end being opposite the proximal end. The core structure may also have a longitudinal extension extending along the longitudinal extension of the handle. At least one protrusion, preferably two protrusions or more, may extend from length extension of the core structure to interlock with the second component to provide a robust handle body. The core-connector unit and the second component can be even better connected my means of the at least one protrusion, and are, thus, not separable under normal use conditions.

The at least one, preferably two or more protrusions may extend from the length extension of the core structure in a substantially orthogonal/perpendicular direction. Such protrusions can easily be manufactured together with the core structure, e.g. by injection molding. The protrusions may facilitate and enable a solid connection and mechanical interlocking between the core structure and the polymeric handle material. The protrusions may have the form of a rib, fin, bar, bridge and/or a nub.

The core structure may provide superior support and strength to the polymeric handle material, and, thus, to the overall handle body, if the core structure comprises a length extension extending at least 20%, preferably at least 25%, further preferably at least 50%, even more preferably at least 75%, or at least 85% along the overall length extension of the handle. Such handle is less likely to get damaged or to break if dropped to the floor, and, thus, may ensure a longer lifetime of the handle.

In general, personal and oral care implements, in particular toothbrushes, comprising exchangeable heads require high quality and robust connector structures as the heads get frequently attached and detached to and from the handle. Defects caused by wear and tear, fatigue or premature ageing are commonly known problems and may result in low quality perception and early substitution of the product.

In order to overcome these drawbacks, the core-connector unit may be made from a fiber-reinforced material. The fiber-reinforced material may be a composite material made of a polymer matrix/polymer base material reinforced with fibers. The polymer base material may be selected from the group of: polyamide (PA, e.g. PA6, PA66), styrene acrylonitrile resin (SAN), polybutylene terephthalate (PBT), polyethylene terephthalate (PET), recycled plastic materials, or mixtures thereof. The polymer base material may at least partially contain recycled plastic material.

Styrene acrylonitrile (SAN) may provide high thermal resistance properties. The acrylonitrile units in the chain enable SAN to have a glass transition temperature greater than 100° C. The properties of SAN may allow for reduced cycle time during a molding step due to relatively earlier and quicker transition temperature. By injection molding of the fiber-reinforced material of the present disclosure, the temperature of the material melt is above the Tg region (viscous or rubbery condition). During cooling the compound attains the high Tg temperature early and reaches dimensional stability (glassy condition). Over-molding of the fiber-reinforced material is possible as the material stays dimensional stable due to the high Tg of the material.

Polybutylene terephthalate (PBT) and/or polyethylene terephthalate (PET) may provide the handle with high quality surface properties, including improved optical characteristics, and high impact strength. Once heated, polybutylene terephthalate and polyethylene terephthalate represent a high temperature-resistant melt having low viscosity and a high Melt Flow Index (MFI). Therefore, processability of the fiber-reinforced material during molding may be improved.

Polyamide (PA) is defined as a polymer with repeating units linked by amide bonds. Polyamides exhibit high durability and strength. For example, polycaprolactam (PA6) and nylon6-6 (PA66) possess high tensile strength, rigidity, good stability under head as well as elasticity and lustre. PA6 and PA66 are highly resistant to abrasion and chemicals such as acids and alkalis. PA6 is generally white and can be dyed prior to production to various colors.

The fibers may be selected from the group of: inorganic particulates, glass fibers, carbon fibers, aramid fibers, basalt fibers, wood fibers, or any combinations thereof. Glass fibers may improve strength, elasticity and heat resistance of the polymer base material. Carbon and aramid fibers may improve elasticity, tensile and compression strength of the polymer base material. Wood fibers may improve flexural strength, tensile modulus, and tensile strength of the polymer base material. Inorganic particulates may improve isotropic shrinkage, abrasion and compression strength of the polymer base material.

The fiber-reinforced material may comprise from about 10 wt % to about 50 wt %, or from about 25 wt % to about 35 wt %, or about 30 wt % fibers. The core-connector unit may be made from a glass fiber-reinforced polymer material comprising about 30 wt % glass fiber. The polymer material may be a polyamide or polybutylene terephthalate, polyethylene terephthalate, or a combination of polybutylene terephthalate and polyethylene terephthalate.

The glass fibers embedded in the polymer material may provide significantly increased stiffness, wear resistance and integrity to the polymer material forming the core-connector unit. For personal implements, e.g. oral care handles from which the heads are getting frequently detached and re-attached, such material provides the connector with wear resistance allowing the handle to be used over a longer period of time. Long lasting connector properties are in particular important for toothbrushes as the head and handle often get soiled with slurry and toothpaste containing abrasive particles. If the connector material is not sufficiently resistant against abrasives, the abrasives may grind/sand down material of the connector, thereby changing the outer geometry of the connector. As a result, the connector may lose its function, and/or its ability to securely hold the head in place during use, e.g. during brushing.

The fiber-reinforced material may have a density from about 1 g/cm$^3$ to about 1.7 g/cm$^3$, preferably about 1.4 g/cm$^3$.

By using different materials for the core-connector unit and the second component, respectively, the handle properties can be improved with regards to different aspects at the same time. The second component made from the polymeric handle material according to the present disclosure comprising a relatively high amount of filler material (i.e. at least 50 wt %) provides the overall handle with a high specific weight, as well as with higher heat conductivity and heat capacity as compared to handles made from e.g. polypropylene. Thus, the handle according to the present disclosure can be perceived as a premium handle versus handles made from standard plastic materials. Height weight/lower temperature are typically attributes that are linked to materials like metal or ceramic, that typically represents a higher level of quality and price point.

However, on the other side, materials with high amount of filler material are more brittle than standard plastic materials, and, thus, can break more easily, e.g. if the handle is dropped to the ground, or hits against a hard object. Surprisingly, it has been found out that the core structure according to the present disclosure may compensate for the brittle characteristics of the second component. If the core structure comprises a length extension extending at least 20%, preferably at least 25%, further preferably at least 50%, even more preferably at least 75%, or at least 85% along the overall length extension of the handle, superior handle stability can be provided. By adding fibers, e.g. glass fibers, to the polymer base material used for manufacturing the core structure, the properties of the core-(connector) unit are improved with regards to strength, elasticity and heat resistance. According to the present disclosure, the fiber-reinforced material forming the core structure can compensate for the increased brittleness of the polymeric handle material forming the second component and may ensure integrity of the product over lifetime, e.g. when the handle is dropped to the floor.

Also, by forming the connector together with the core structure, solid attachment of the head to the handle can be ensured, as well. As not only the core structure, but also the connector may be formed from the fiber-reinforced material, the fit of the head onto the connector of the handle may less likely wear out over the life time of the personal care implement, thereby providing not only a high quality consumer product, but also a more sustainable, and eco-friendly personal care implement.

Further, the combination of the specifically chosen materials used for the core-connector unit and the second component allows for simple overmolding of the core structure with the polymeric handle material of the second component without the need for complex assembly steps.

To provide improved gripping properties of the handle, a third component, e.g. a thermoplastic elastomer material (TPE) and/or a polypropylene material, may be overmolded onto the core structure and/or the second component. The third component may provide gripping area(s) on the outer surface of the handle.

For example, the handle may comprise a thumb rest being made from the third component, e.g. a thermoplastic elastomer material and/or a polypropylene material. These materials can be easily injection molded over the core structure and/or the second component as discussed above. Such thumb rest may provide the handle of the personal care implement with improved handling properties, e.g. with anti-slip properties to improve the maneuverability of the personal care implement under wet conditions, e.g. when the user brushes teeth. The thumb rest may be made from thermoplastic elastomer having a Shore A hardness from about 30 to about 60, or about 40 to prevent the oral care implement from being too slippery when used in wet conditions. At least a portion of the thumb rest may have a concave shape with an angle α with respect to the area of the remaining portion of the thumb rest from about 20° to about 25°, or about 24°. Alternatively, the thumb rest may be an elongated strip extending along the length extensions of the handle. The thumb rest or a gripping region may be attached onto the front surface of the handle in the region close to the proximal end, i.e. closest to the head. The thumb rest may comprise a plurality of ribs extending substantially perpendicular and/or diagonal to the longitudinal axis of the handle. Such ribs may allow users/consumers to use the personal care implement with even more control. The user/consumer can better grasp and manipulate the handle during use. Such handle may provide further improved control and greater comfort during use (e.g. tooth brushing), in particular under wet conditions.

The third component may not only form the thumb rest on the front surface of the handle, but also a palm grip on the back surface being opposite the front surface to be gripped by the user's/consumer's fingers and thumb. Such handle configuration may even further resist slippage during use. The third component material (e.g. TPE) may extend through an aperture provided in the underlying second component and/or core structure.

A method for manufacturing a handle for a personal care implement may comprise the following steps:

molding a core-connector unit from a fiber-reinforced material, the core-connector unit comprising a core structure and a connector for attaching a head to the handle, the connector comprising a cavity, at least partially overmolding the core-connector unit with a polymeric material to form a second component, the polymeric material comprising a filler material, at least partially overmolding the core-connector unit and/or the second component with a material to form a third component, preferably a thermoplastic elastomer, to form a grip portion of the handle, inserting a snap-fit element into the cavity of the connector.

The snap-fit element may be a spring-loaded ball element. To this end, a spring, a ball and a cap holding the compressed spring and ball in place may be inserted into the cavity of the connector. The cap may be fixed in the cavity by e.g. press fitting and/or ultrasonic welding. The cap may be made from the fiber-reinforced material according to the present disclosure or from a different material, e.g. metal.

A part of the core structure may remain visible at the outside of the handle, e.g. to provide additional color contrasting structures improving the aesthetical appearance of the handle. For example, an area exhibiting a logo can be provided by a part of the core structure excluded from overmolding, and, thus, remaining visible.

The handle according to the present disclosure may comprise from about 5 wt % to about 20 wt % of fiber-reinforced material forming the core-connector unit, from about 70 wt % to about 95 wt % of a polymeric material comprising a filler and forming the second component, and from about 1 wt % to about 10 wt % of a third component material, preferably a thermoplastic elastomer, to form a grip portion of the handle.

The handle according to the present disclosure may comprise from about 13 wt % to about 18 wt % of fiber-reinforced material forming the core-connector unit, from about 75 wt % to about 85 wt % of a polymeric material comprising a filler and forming the second component, and from about 2 wt % to about 5 wt % of a third component material, preferably a thermoplastic elastomer, to form a grip portion of the handle.

Since the material of the handle (material of the core-connector structure and of the second component) may have a higher density than the material of the head (e.g. made from polypropylene), the center of mass/center of gravity lies within the handle (even if the brush head is loaded with toothpaste) which enables users to perform a well-coordinated brushing technique with improved sensory feeling during brushing. The center of gravity provided in the center of the handle provides an oral care implement which is better balanced and does not tip over/does not get head loaded once toothpaste is applied onto the brush head. Further, when users apply the different grip styles/brushing techniques, the oral care implement according to the present disclosure has the advantage that the center of gravity is in or very close to the pivot point of the wrist joint. A balanced toothbrush is easier to control in the mouth, thereby allowing more precise and accurate brushing movements which enables better cleaning.

While the high quality and relatively expensive handle of the personal care implement is adapted for use over a longer period of time as compared to common implements, e g manual toothbrushes which are discarded after about three months of use, the relatively cheap refill can be exchanged on a regular basis, e.g. after about three months. This provides a cost-efficient and environmentally sustainable high quality personal/oral care implement.

Further, as the polymeric material of the second component may comprise a relatively high amount of filler material which may be pre-mixed with at least a portion of the base material, such polymeric material may allow for control of the weight of the handle in whatever location, e.g. by filler variation. Control of the overall personal care implement may be beneficially due to the relatively high weight of the handle. It is now possible to use the mass/weight distribution of the polymeric material for adaption of the inertial moment of the finished handle.

As discussed above, the head of the personal care implement can be attached to the handle via the connector comprising a snap-fit element/snap-fit locking mechanism to ensure sufficiently strong connection and stability between the head and the handle, e.g. to enable a user to perform a brushing action. The connector may have an outer lateral surface and a recess therein, the recess forming a cavity within the connector. Within the cavity a spring-loaded ball element may be provided. The spring-loaded ball element may comprise a ball and a spring, the spring applying a radial force onto the ball in a direction towards the outer lateral surface of the connector. In the following a radial force is defined by a force applied in a direction being substantially perpendicular to the longitudinal length extension of the connector. The spring applies a force onto the ball and pushes the ball outwards so that the ball extends slightly beyond the outer lateral surface of the connector. An inner wall of a hollow portion provided in the head may comprise a recess for receiving the ball of the spring-loaded ball element. Once the head is snap-fitted onto the connector, the head is fixed on the handle/connector in an axial direction. In other words, the connector allows for easy attachment/detachment of the head to and from the handle. A user can attach the head to the handle by a simple linear motion. Further, the ball-snap may provide a precise fixation of the head, and a distinct haptic feedback may be given to the user that the head is snapped-on securely. In other words, the user may recognize once the ball engages into the recess provided in the inner wall of the hollow portion of the head. The brush head can be easily removed, i.e. without performing a synchronized action with other elements/unlocking mechanisms.

The head can be fixed on the handle until a specific/predetermined pull-off force is applied. The connection between the head and connector is sufficiently strong enabling well-coordinated brushing techniques. The head does not get loosened from the handle and does not twist aside during use, e.g. brushing.

The ball and/or the spring of the spring-loaded ball element may be made from stainless steel. While typical snap elements comprise a spring element made from plastic that shows relaxation and aging effects over time, a stainless steel spring shows a constant spring rate over time, also under extended use conditions (e.g. temperature). A spring-loaded ball element made from stainless steel may provide long-lasting, reliable fixation of the head on the connector/handle.

The connector may comprise a first substantially cylindrical section and a second substantially cylindrical section, wherein the first and the second cylindrical sections may be connected by an at least partially conically shaped section. The first substantially cylindrical section, the at least partially conically shaped section and the second substantially cylindrical section may be arranged in consecutive order and may define a longitudinal length extension of the connector. The first and the second substantially cylindrical sections may be placed off-center with respect to the longitudinal length extension of the connector.

In the following, a substantially cylindrical section is defined by a three-dimensional body having a longitudinal length extension and a cross-sectional area extending substantially perpendicular to the longitudinal length extension. The cross-sectional area has a shape being substantially constant along the longitudinal length extension. Since the connector may be manufactured by an injection molding process, a substantially cylindrical section also comprises sections/bodies which have a slight draft angle of up to 2°. In other words, a substantially cylindrical section also comprises a section/body which tapers slightly by up to 2° towards a proximal end which is closest to the head once the head is attached to the connector.

The cross-sectional area may have any shape, for example substantially circular, ellipsoid, rectangular, semi-circular, circular with a flattening portion, convex or concave. The cross-sectional area may have the shape of a polygon, for example of a square or triangle. The outer lateral surface circumventing the cylinder along its length extension can be defined as being composed of straight lines which are substantially parallel with respect to the longitudinal length extension of the cylinder.

The head of the oral care implement has a distal end and a proximal end, the proximal end being defined as the end closest to the handle. The proximal end of the head may comprise a hollow portion for receiving a part of the connector, for example, the second substantially cylindrical section, the at least partially conically shaped section and a part of the first substantially cylindrical section. The hollow portion of the head may have an inner wall with a geometry/contour which corresponds to the outer geometry/contour of the part of the connector to be inserted into the hollow portion of the head. The eccentric arrangement/off-center positioning of the substantially cylindrical sections of the connector enables precise positioning of the brush head on the handle. The geometric position of the head can be clearly defined. As the handle comprises the connector at a proximal end being closest to the head, the eccentric/off-center arrangement of the two substantially cylindrical sections may act as a guidance element when a user attaches the head to the handle. In other words, the two substantially cylindrical sections may allow for accurate fitting between the head and the handle. Further, the eccentric/off-center arrangement of the two substantially cylindrical sections may provide an anti-twist protection for the head on the handle during brushing, for example if a lateral force is applied onto the head.

The first substantially cylindrical section and the second substantially cylindrical section have a length extension and a cross-sectional area extending substantially perpendicular to the length extension, and the cross-sectional area of the first substantially cylindrical section and/or second of the second substantially cylindrical section may be substantially circular. Such geometry provides a robust and simple structure which is easy to clean after usage of the oral care implement. Further, since the outer geometry is relatively simple, such connector can be manufactured in a cost-efficient manner.

The first substantially cylindrical section may have a cross-sectional area being greater than the cross-sectional area of the second substantially cylindrical section. For example, the first substantially cylindrical section to be inserted into a hollow portion at the proximal end of the handle, may have a substantially circular cross-sectional area with a diameter of about 8 mm to about 10 mm, preferably about 9 mm, while the second substantially cylindrical section to be inserted into a hollow portion at the proximal end of the head, may have a substantially circular cross-sectional area with a diameter of about 4 mm to about 6 mm, preferably about 5 mm.

The first and the second substantially cylindrical sections may have a first and a second longitudinal central axis, respectively which are defined as the symmetry axis of the first and the second substantially cylindrical sections. The first and the second substantially cylindrical sections may be placed/arranged with respect to each other so that the second longitudinal central axis of the second cylindrical section is located off-center with respect to the first longitudinal central axis of the first cylindrical section by about 1 mm to about 2.5 mm, or by about 1.5 mm to about 2 mm, or by about 1.65 mm. In other words, the center of the second substantially cylindrical section is offset/eccentric from the longitudinal central axis of the first substantially cylindrical section by a distance of about 1 mm to about 2.5 mm, or of about 1.5 mm to about 2 mm, or of about 1.65 mm.

Such connector may be easy to manufacture, e.g. by injection molding, and provides sufficient torsional stability for the oral care implement if lateral forces are applied onto the brush head.

The first and/or the second substantially cylindrical section may comprise a flattening portion extending along the length extension of the first and/or second substantially cylindrical section. Such flattening portion may provide the personal care implement (e.g. toothbrush) with additional anti-twist protection for the head being connected to the handle during use (e.g. brushing), for example if a lateral force is applied onto the head.

The first and the second substantially cylindrical sections may have a first and a second outer surface, respectively, and the first and the second substantially cylindrical sections may be arranged with respect to each other so that a part of the first outer surface and a part the second outer surfaces are substantially in straight alignment. The flattening portion, optionally comprising the spring-loaded ball element, may be arranged opposite the first and second outer surfaces being substantially in straight alignment. Such connector has an easy to clean outer geometry. The connector is robust, easy to use, and can be manufactured in a cost-efficient manner.

The proximal end of the handle (e.g. the ring/collar provided at the intersection between the connector and core structure) may comprise a chamfered surface. Such chamfered surface may provide the oral care implement with additional anti-twist protection during use. The chamfered surface and a cross-sectional area of the handle may define an angle α from about 15° to about 30°, or from about 18° to about 28°, or about 25°. Said cross-sectional area is defined by an area extends substantially perpendicular to the longitudinal length extension of the handle. Surprisingly, it has been found out that such angled/chamfered surface provides superior anti-twist protection. Furthermore, the angled/chamfered surface allows for draining-off fluids, like toothpaste slurry and saliva, after use of the oral care implement, thereby preventing accumulation of such fluids over time.

The connector allows for easy attachment/detachment of the head to and from the handle. The user can attach the head to the handle by a simple linear motion. With the specific design of the substantially cylindrical sections being arranged off-center, and the chamfered surface of the handle, the head is turned into the right orientation automatically during the attachment motion (within certain tolerances). Therefore, the consumer is not forced to precisely position the head on the handle before snapping it on. Further, the ball-snap provides a precise fixation of the brush head, and a distinct haptic feedback is given to the consumer that the head is snapped-on securely. The brush head can be easily removed, without any synchronized action with other elements (unlocking mechanisms). In addition, the connector can be cleaned easily. The specific design of the connector may not have any recesses in which dirt, toothpaste and/or saliva accumulate. The connector may also avoid any fragile structures by comprising substantially round edges, only, which may prevent easy breakage or damage of the surfaces.

To allow sufficiently good fitting of the brush head on the connector if production tolerances occur, the inner wall of the hollow portion of the head may comprise at least one rip, or two rips being arranged opposite each other, for precisely adjusting the head on the connector/handle. Furthermore, the at least one rip may prevent compression of air in the hollow portion of the head which could act like a spring or as additional resistance while snapping the head on the connector/handle.

The personal care implement may be an oral care implement, in particular a toothbrush comprising a handle and a toothbrush head with tooth cleaning elements.

The tooth cleaning elements of the oral care implement, e.g. bundle of filaments forming one or a plurality of tufts, may be attached to the head by means of a hot tufting process. One method of manufacturing the head with tufts of filaments embedded in the head may comprise the following steps: In a first step, tufts are formed by providing a desired amount of filaments. In a second step, the tufts are placed into a mold cavity so that ends of the filaments which are supposed to be attached to the head extend into said cavity. The opposite ends of the filaments not extending into said cavity may be either end-rounded or non-end-rounded. For example, the filaments may be not end-rounded in case the filaments are tapered filaments having a pointed tip. In a third step the head is formed around the ends of the filaments extending into the mold cavity by an injection molding process, thereby anchoring the tufts in the head. Alternatively, the tufts may be anchored by forming a first part of the head—a so called "sealplate"—around the ends of the filaments extending into the mold cavity by an injection molding process before the remaining part of the oral care implement is formed. Before starting the injection molding process the ends of the tufts extending into the mold cavity may be optionally melted or fusion-bonded to join the filaments together in a fused mass or ball so that the fused masses or balls are located within the cavity. The tufts may be held in the mold cavity by a mold bar having blind holes that correspond to the desired position of the tufts on the finished head of the oral care implement. In other words, the tufts attached to the head by means of a hot tufting process are not doubled over a middle portion along their length and are not mounted in the head by using an anchor/staple. The tufts are mounted on the head by means of an anchor-free tufting process.

Alternatively, the head for the oral care implement may be provided with a bristle carrier having at least one tuft hole, e.g. a blind-end bore. A tuft comprising a plurality of filaments may be fixed/anchored in said tuft hole by a stapling process/anchor tufting method. This means, that the filaments of the tuft are bent/folded around an anchor, e.g. an anchor wire or anchor plate, for example made of metal, in a substantially U-shaped manner. The filaments together with the anchor are pushed into the tuft hole so that the anchor penetrates into opposing side walls of the tuft hole thereby anchoring/fixing/fastening the filaments to the bristle carrier. The anchor may be fixed in opposing side walls by positive and frictional engagement. In case the tuft hole is a blind-end bore, the anchor holds the filaments against a bottom of the bore. In other words, the anchor may lie over the U-shaped bend in a substantially perpendicular manner Since the filaments of the tuft are bent around the anchor in a substantially U-shaped configuration, a first limb and a second limb of each filament extend from the bristle carrier in a filament direction. Filament types which can be used/are suitable for usage in a stapling process are also called "two-sided filaments". Heads for oral care implements which are manufactured by a stapling process can be provided in a relatively low-cost and time-efficient manner.

The following is a non-limiting discussion of example embodiments of personal care implements and parts thereof in accordance with the present disclosure, where reference to the Figures is made.

FIG. 1 shows a personal care implement 10, in this specific embodiment a manual toothbrush 10. The manual toothbrush 10 comprises a handle 12 and head 14, the head 14 being repeatedly attachable to and detachable from the handle 12 via a connector 16. The handle 12 may be formed by using the process as shown in the flow chart of FIG. 8 and as further explained below.

Handle 12 comprises connector 16 unitarily made with a core structure 18 to form a core-connector unit 20, a second component 22, a third component 24 and a spring-loaded snap element 26.

The core-connector unit 20 (shown in FIG. 2 in detail) is made from a fiber-reinforced material. The fiber-reinforced material is a composite material comprising a polymer base material and fiber. The composite material may comprise from about 10 wt % to about 50 wt %, preferably from about 25 wt % to about 35 wt %, further preferably about 30 wt % fiber. The fibers may be selected from the group of: glass fibers, carbon fibers, aramid fibers, basalt fibers, wood fibers, or any combinations thereof. The polymer base material may be selected from the group of: polyamide, styrene acrylonitrile resin, polybutylene terephthalate, polyethylene terephthalate, recycled plastic materials, or mixtures thereof. The polymer base material may at least partially contain recycled plastic material.

In this specific embodiment, the fiber-reinforced material may comprise polyamide as the polymer base material and from about 30 wt % to about 35 wt % glass fiber.

The fiber-reinforced material has a density from about 1 $g/cm^3$ to about 1.7 $g/cm^3$, in this specific embodiment about 1.4 $g/cm^3$.

As shown in FIGS. 3 and 4, the core structure 18 of the core-connector unit 20 is partially embedded in/overmolded by the second component 22.

The core-connector unit 20 together with the second component 22 define the overall length extension 28 of the handle 12. The length extension 28 of the handle 12 extends from a proximal end 30 closest to the head 14 to a distal end 32, the distal end 32 being opposite the proximal end 30.

The second component is made from a polymeric material comprising a base material and a filler material, preferably an inorganic filler material, wherein the base material is selected from: polyamide, styrene acrylonitrile resin, polybutylene terephthalate, polyethylene terephthalate or mixtures thereof, and wherein the filler material may constitute from about 50 wt % to about 80 wt % of the polymeric material. The filler material is selected from the group of: zinc oxide, iron oxide, barium sulfate, titanium dioxide, aluminium oxide, or any combinations thereof. In this specific embodiment, the second component may be made from a polymeric material comprising polyamide as a base material and from about 60 wt % to about 75 wt % zinc oxide.

The polymeric material of the second component has a density from about 2 g/cm$^3$ to about 3.5 g/cm$^3$, in this specific embodiment about 2.7 g/cm$^3$.

To compensate for brittle characteristics of the second component 22, the core structure 18 comprises a length extension 34 extending at least 20%, preferably at least 25%, further preferably at least 50%, even more preferably at least 75%, or at least 85% along the overall length extension 28 of the handle 12. In this specific embodiment, the core structure 18 extends at least 85% along the overall length extension 28 of the handle 12. By adding glass fibers to the polymer base material, the properties of the polymer base is improved with regards to strength, elasticity and heat resistance.

The core structure 18 further comprise a plurality of protrusions 36 extending from the length extension 34 of the core structure 18 in a substantially orthogonal direction. The protrusions 36 facilitate and enable a solid connection and mechanical interlocking between the core structure 18 and the second component 22. The protrusions may have the form of a rib, fin, bar, bridge and/or a nub (see FIGS. 2 and 3).

The connector 16 of the core-connector unit 20 further comprises a ring/collar 38 at the intersection 40 to the core structure 18 to ensure a tight connection between the core-connector unit 20 and the second component 22 (see FIGS. 2 and 7). The collar/ring 38 comprise a step 39 or recess 38 provided in the area being in direct contact with the second component 22. When the step/recess 39 provided in the outer geometry of the collar 38 gets overmolded by the material forming the second component 22, a very tight fitting between the core-connector unit 20 and the second component 22 can be provided. Such tight fitting may eliminate any gaps between the core-connector unit 20 and the second component 22, in which toothpaste slurry could accumulate otherwise, thereby rending the handle more hygienic. The step 39 may have relatively small dimensions, e.g. a height 41 from about 0.5 mm to about 1.5 mm, thereby still providing the benefits of a tight fit. If the height 41 of the step is relatively small (e.g. from about 0.5 mm to about 1.5 mm) the layer 42 of the second component material covering the step/recess 39 may be accordingly relatively thin, i.e. from about 0.5 mm to about 1.5 mm. When molding the second component material 22 onto the core structure 18, the material of the second component shrinks to some extent. Consequently, a press fit between the core structure 18 and the second component 22 is provided which ensures a secure connection between the core-connector unit 20 and the second component 22.

To provide improved gripping properties of the handle 12, the third component 24, e.g. a thermoplastic elastomer material (TPE) and/or a polypropylene material, may be overmolded onto the core structure 18 and/or the second component 22. The third component 24 provides a gripping area 44 on the outer surface 46 of the handle 12 (see FIGS. 5 and 6). In this specific embodiment, an elongated strip 48 of TPE material is provided on the front surface 50 of the handle 12.

Figure 8:
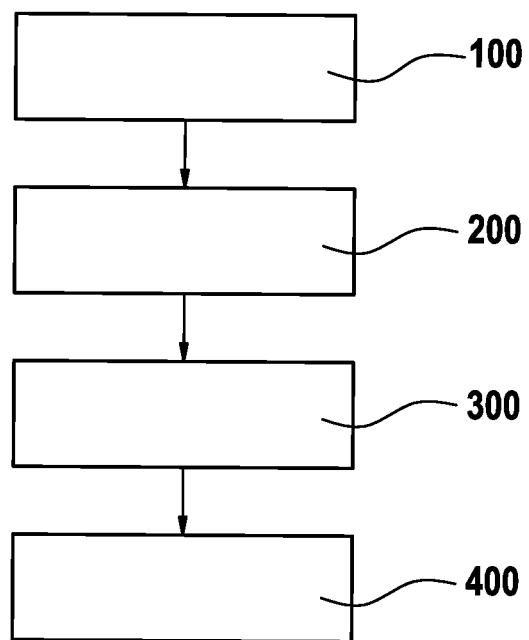
FIG. 8 shows the method steps for manufacturing the handle of FIG. 1.

FIG. 8 illustrates the method steps for manufacturing the handle 12 for the personal care implement 10:

In a first step 100, a core-connector unit 20 is molded, preferably injection-molded, from a fiber-reinforced material, the core-connector unit 20 comprising a core structure 18 and a connector 16 for attaching a head 14 to the handle 12, the connector 16 comprising a cavity 52.

In a second step 200, the core-connector unit 20 is at least partially overmolded, preferably injection-molded, with a polymeric material to form a second component 22, the polymeric material comprising a filler material.

In a third step 300, the core-connector unit 20 and/or the second component 22 is at least partially overmolded, preferably injection-molded, with a material to form a third component 24, preferably a thermoplastic elastomer, to form a grip portion or a gripping area 44 of the handle 12.

In a fourth step 400, a snap-fit element 26 is inserted into the cavity 52 of the connector 16. The snap-fit element 26 may be a spring-loaded ball element. To this end, a spring 54, a ball 56 and a cap 58 holding the compressed spring 54 and ball 56 in place may be inserted into the cavity 52 of the connector 16. The cap 58 may be fixed in the cavity 52 by e.g. press fitting and/or ultrasonic welding. The cap 58 may be made from the fiber-reinforced material according to the present disclosure or from a different material, e.g. metal.

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. A handle (12) for a personal care implement (10), the handle (12) comprising a core structure (18) and a polymeric handle material,
    wherein the polymeric handle material forms a second component (22) that at least partially covers the core structure (18);
    wherein the polymeric handle material comprises a polymer base material and an inorganic filler material,
    wherein the polymer base material is selected from the group consisting of polyamide, styrene acrylonitrile resin, polybutylene terephthalate, polyethylene terephthalate, recycled plastic materials, and any combination thereof, and
    wherein the filler material comprises zinc oxide present in an amount of from about 50 wt % to about 80 wt % of the polymeric handle material.

2. The handle (12) of claim 1, wherein the filler material further comprises a material selected from the group consisting of iron oxide, barium sulfate, titanium dioxide, aluminum oxide, and any combination thereof.

3. The handle (12) of claim 1, wherein the polymeric handle material has a density of from about 2 g/cm$^3$ to about 3.5 g/cm$^3$.

4. The handle (12) of claim 3, wherein the polymeric handle material has a density of about 2.7 g/cm$^3$.

5. The handle (12) of claim 1, wherein the filler material is zinc oxide constituting from about 70 wt % to about 75 wt % of the polymeric handle material, and wherein the polymer base material is polyamide.

6. The handle (12) of claim 1, wherein the handle (12) further comprises a connector (16) for repeatedly attaching and detaching a head (14) to and from the handle (12), wherein the connector (16) and the core structure (18) are unitarily made to form a core-connector unit (20).

7. The handle (12) of claim 6, wherein the handle (12) has a longitudinal extension (28) extending between a proximal end (30) closest to the head (14) and a distal end (32) opposite to the proximal end (30), and the core structure has a longitudinal extension (34) extending along the longitudinal extension (28) of the handle (12), the core structure (18) extending with its length extension (34) at least 20% of the handle (12).

8. The handle (12) of claim 7, wherein the core structure (18) extends at least 50% along the length extension (28) of the handle (12).

9. The handle (12) of claim 8, wherein the core structure (18) extends at least 75% along the length extension (28) of the handle (12).

10. The handle (12) of claim 6, wherein the core-connector unit (20) comprises a circular collar (38) disposed between the connector (16) and the core structure (18), the circular collar (38) being unitarily formed with the core-connector unit (20).

11. The handle (12) of claim 6, wherein the core-connector unit (20) is made from a fiber-reinforced material.

12. The handle (12) of claim 11, wherein the fiber-reinforced material comprises from about 10 wt % to about 50 wt % of fiber, the fiber being selected from the group consisting of glass fibers, carbon fibers, aramid fibers, basalt fibers, wood fibers, and any combination thereof.

13. The handle (12) of claim 12, wherein the fiber-reinforced material comprises from about 25 wt % to about 35 wt % of fiber.

14. The handle (12) of claim 11, wherein the fiber-reinforced material is a composite material comprising a polymer base material selected from the group consisting of polyamide, styrene acrylonitrile resin, polybutylene terephthalate, polyethylene terephthalate, recycled plastic materials, and any combination thereof.

15. The handle (12) of claim 1, wherein the core structure (18) comprises at least one protrusion (38) interlocking with the second component (22).

16. The handle (12) of claim 1, wherein the filler material constitutes from about 70 wt % to about 75 wt % of the polymeric handle material.

17. A personal care implement (10) comprising the handle (12) of claim 1 and a head (14).

18. The personal care implement (10) of claim 17, wherein the handle (12) and the head (14) are configured to allow the head (14) to be repeatedly attachable to and detachable from the handle (12).

19. The personal care implement (10) of claim 17, wherein the head is a toothbrush head with tooth cleaning elements.

20. The personal care implement (10) of claim 17, wherein the personal care implement (10) is a wet shaving razor.

* * * * *